US009025695B2

(12) United States Patent
Roh

(10) Patent No.: US 9,025,695 B2
(45) Date of Patent: May 5, 2015

(54) NETWORK INTERFACE APPARATUS, SYSTEM AND METHOD FOR WIRELESS ETHERNET

(75) Inventor: Ho Jin Roh, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 142 days.

(21) Appl. No.: 13/565,556

(22) Filed: Aug. 2, 2012

(65) Prior Publication Data

US 2013/0034184 A1 Feb. 7, 2013

(30) Foreign Application Priority Data

Aug. 3, 2011 (KR) ........................ 10-2011-0077218

(51) Int. Cl.
*H04L 27/00* (2006.01)
*H04L 12/413* (2006.01)

(52) U.S. Cl.
CPC ..................................... *H04L 12/413* (2013.01)

(58) Field of Classification Search
CPC .. H04L 12/413; H04L 29/06068; H04L 69/08
USPC .................. 375/295, 316, 219, 377
See application file for complete search history.

(56) References Cited

U.S. PATENT DOCUMENTS

| 8,155,136 | B2* | 4/2012 | Lin et al. ........................ 370/420 |
| 2005/0248652 | A1* | 11/2005 | Firestone et al. ........... 348/14.09 |
| 2008/0091857 | A1* | 4/2008 | McDaniel ........................ 710/72 |
| 2008/0297520 | A1* | 12/2008 | Montag ........................ 345/501 |
| 2008/0307143 | A1* | 12/2008 | Lin ................................ 710/302 |
| 2010/0067539 | A1 | 3/2010 | Lin et al. |
| 2011/0072482 | A1* | 3/2011 | Lau ................................ 725/116 |
| 2011/0107004 | A1* | 5/2011 | Maitra ........................ 710/316 |
| 2011/0219279 | A1* | 9/2011 | Abu-Surra et al. ........... 714/746 |
| 2011/0273533 | A1* | 11/2011 | Ngo et al. ........................ 348/43 |
| 2012/0002103 | A1* | 1/2012 | Shao et al. ................. 348/388.1 |
| 2012/0057508 | A1* | 3/2012 | Moshfeghi ..................... 370/277 |
| 2012/0079143 | A1* | 3/2012 | Krishnamurthi et al. ....... 710/39 |
| 2012/0224496 | A1* | 9/2012 | Shao et al. ..................... 370/248 |
| 2012/0287797 | A1* | 11/2012 | Basson et al. ................. 370/252 |
| 2012/0324047 | A1* | 12/2012 | Diner et al. ................... 709/217 |
| 2013/0042291 | A1* | 2/2013 | Kambhatla .................... 725/127 |

FOREIGN PATENT DOCUMENTS

TW 201012153 A 3/2010

OTHER PUBLICATIONS

Elboim et al., "The Future of Wireless Technology is Here: Introducing "Truly Wireless" with PCIe," Wilocity, 7 Pages, Jul. 2010.

* cited by examiner

*Primary Examiner* — Kenneth Lam
(74) *Attorney, Agent, or Firm* — Birch, Stewart, Kolasch & Birch, LLP

(57) ABSTRACT

A network interface apparatus for wireless Ethernet is provided. The network interface apparatus includes: a Network Interface Card (NIC) control unit for converting a gigabit wired Ethernet signal into a Peripheral Component Interconnect express (PCIe) signal; a wireless network processing unit for converting the PCIe signal received from the NIC control unit into an analog signal; and an RF transmitting/receiving unit for converting the analog signal inputted from the wireless network processing unit into an RF signal of a 60 GHz frequency band to transmit the converted RF signal into a wireless terminal device.

12 Claims, 2 Drawing Sheets

NETWORK INTERFACE APPARATUS, SYSTEM AND METHOD FOR WIRELESS ETHERNET

CROSS-REFERENCE TO RELATED APPLICATIONS

The present application claims priority under 35 U.S.C. 119 and 35 U.S.C. 365 to Korean Patent Application No. 10-2011-0077218 (filed on Aug. 3, 2011), which is hereby incorporated by reference in its entirety.

BACKGROUND

The present disclosure relates to a network interface apparatus for wireless Ethernet, and more particularly, to a network interface apparatus for converting a gigabit wired Ethernet signal entering into a home into a wireless Ethernet signal.

In general, the gigabit Ethernet, the standard of the IEEE 802.3 Ethernet group, was initially used for a Local Area Network (LAN) of an enterprise level such as schools or companies, due to the distance restriction, i.e., the 5 Km maximum distance. Additionally, as an optical transceiver of the 100 Km maximum distance, i.e., the industry standard, is developed recently, the gigabit Ethernet's usable area broadens to a Metro Area Network of a metropolitan scale.

Currently, a wired Ethernet in home usage may be classified into 10 Mbps, 100 Mbps, 1000 Mbps, and 1 Gbps in terms of a transfer rate, and in the future, a 1 Gbps wired Ethernet may be expected to be extensively used. Furthermore, in order to utilize a gigabit wired Ethernet, a network interface apparatus, i.e., a Network Interface Card (NIC) is required in a desktop computer.

The network interface apparatus converts a wired Ethernet signal into a Peripheral Component Interconnect (PCI) signal or a PCI express (PCIe) signal and provides the converted signal into a Central Processing Unit (CPU).

In addition, network interface apparatuses for desktop computers to use the gigabit wired Ethernet are manufactured and provided commercially only by several companies now. However, a network interface apparatus for allowing the gigabit wired Ethernet signal entering into a home to be connected to a notebook computer wirelessly is not provided yet. Accordingly, a network interface apparatus for connecting the gigabit wired Ethernet signal with a notebook computer wirelessly is required urgently.

SUMMARY

Embodiments provide a network interface apparatus and system for allowing a gigabit wired Ethernet signal entering into a home to be connected to a portable device wirelessly.

Embodiments also provide a network interface apparatus and a system for playing image and sound data transmitted wirelessly from a portable terminal device in a display device.

In one embodiment, a network interface apparatus includes: a Network Interface Card (NIC) control unit for converting a gigabit wired Ethernet signal into a Peripheral Component Interconnect express (PCIe) signal; a wireless network processing unit for converting the PCIe signal received from the NIC control unit into an analog signal; and an RF transmitting/receiving unit for converting the analog signal inputted from the wireless network processing unit into an RF signal of a 60 GHz frequency band to transmit the converted RF signal into a wireless terminal device.

In another embodiment, a network interface system for providing a wired Ethernet signal into a mobile terminal includes: a network interface apparatus including: a Network Interface Card (NIC) control unit for converting a gigabit wired Ethernet signal into a PCIe signal; a wireless network processing unit for converting the PCIe signal received from the NIC control unit into an analog signal; and an RF transmitting/receiving unit for converting the analog signal inputted from the wireless network processing unit into an RF signal of a 60 GHz frequency band to transmit the converted RF signal into a wireless terminal device; and a wireless NIC transmitting/receiving device for receiving and converting the RF signal outputted from the network interface apparatus, and then delivers the converted RF signal to a wireless terminal device.

In further another embodiment, a network interface method includes: converting a gigabit wired Ethernet signal into a signal compatible with a wireless terminal device; converting the signal compatible with a wireless terminal device into an analog signal; and converting the analog signal into an RF signal of a predetermined frequency band to transmit the converted RF signal to a wireless terminal device including a wireless NIC transmitting/receiving device.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Moreover, detailed descriptions related to well-known functions or configurations will be ruled out in order not to unnecessarily obscure subject matters of the present invention. Also, the terms described below are defined in consideration of the functions of the present invention, and thus, the definitions of the terms vary according to the intention and social custom of a user or operator. Therefore, their definition should be made on the basis of the contents over the present invention.

The present invention provides a network interface apparatus and system for converting a gigabit wired Ethernet signal entering a home into a wireless Ethernet signal.

Hereinafter, embodiments will be described with reference to the accompanying drawings.

Figure 1:
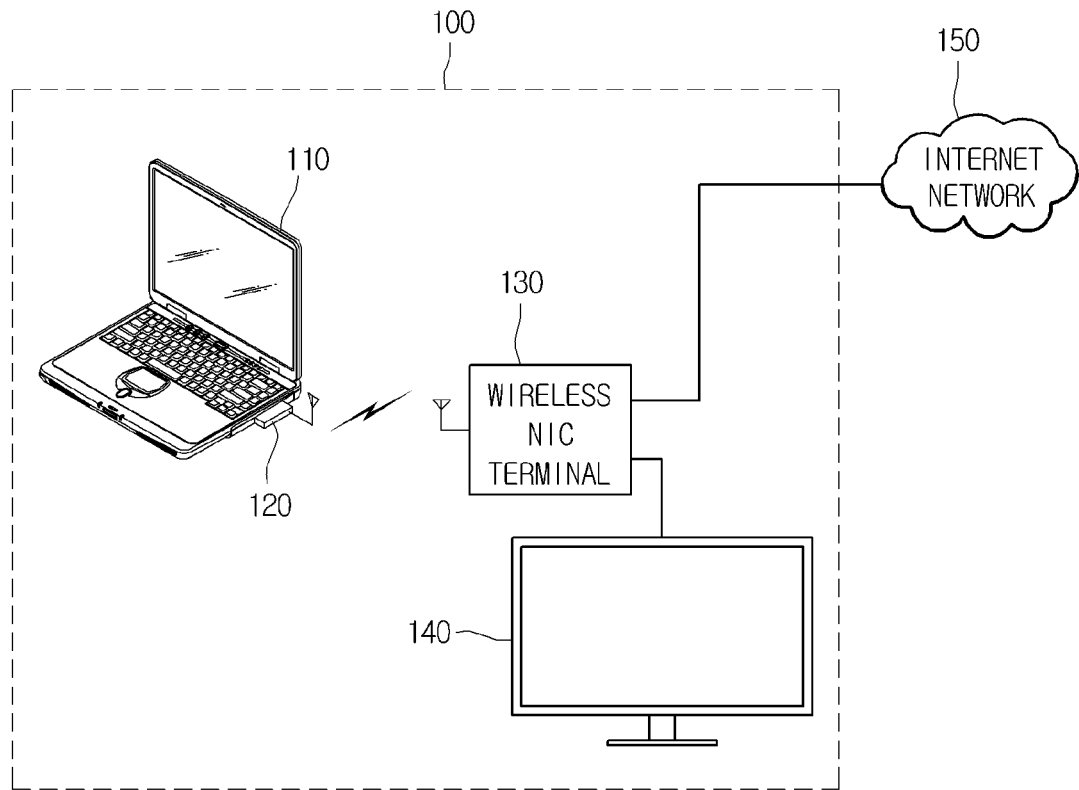
FIG. 1 illustrates a network interface system for providing an environment in which a wired Ethernet signal entering into a home is wirelessly connected to a notebook computer.

FIG. 1 illustrates a network interface system for providing an environment in which a wired Ethernet signal entering into a home is wirelessly connected to a notebook computer.

Referring to FIG. 1, the network interface system includes a mobile terminal device 110, a wireless Network Interface Card (NIC) transmitting/receiving device 120, a wireless NIC terminal 130, and a display device 140 in a home 100.

The mobile terminal 110 is in the home 100 and may be a notebook computer, a portable terminal, or a smart phone, each of which receives a wireless Ethernet signal. Hereinafter, the mobile terminal device 110 will be described assuming it as a notebook computer. The notebook computer 110 exemplarily used as a wireless terminal device.

The notebook computer 110 may wirelessly receive a gigabit wired Ethernet signal entering from an external internet network 150 into the home 100 by using the wireless NIC transmitting/receiving device 120 and the wireless NIC terminal 130.

Additionally, the notebook 110 may transmit image and sound data to the wireless NIC terminal 130 through the wireless NIC transmitting/receiving device 120. Then, the wireless NIC terminal 130 provides the received image and sound data to the display device 140, which is connected thereto, to play corresponding image and sound data.

The wireless NIC transmitting/receiving device 120 is connected to a Peripheral Component Interconnect (PCI) terminal or a PCI express (PCIe) terminal of the notebook computer 110. The wireless NIC transmitting/receiving device 120 provides the received wireless Ethernet signal from the wireless NIC terminal 130 to the notebook computer 110. Additionally, the wireless NIC transmitting/receiving device 120 may transmit the image and sound data outputted from the notebook computer 110 to the wireless NIC terminal 130 through a wireless communication method.

The wireless NIC terminal 130 converts a gigabit wired Ethernet signal entering from the external internet network 140 into a wireless Ethernet signal and then transmits the converted wireless Ethernet signal to the wireless NIC transmitting/receiving device 120.

Moreover, the wireless NIC terminal 130 converts the image and sound data received from the wireless NIC transmitting/receiving device 120 into a format compatible with the display device 140, for example, a High-Definition Multimedia Interface (HDMI) signal, and then provides the converted format into the display device 140.

The display device 140 is in the home 100 and may be a TV or a monitor for playing image and sound data. The display device 140 receives a signal from the wireless NIC terminal 130 and outputs it through a display or a speaker. For this, as mentioned above, the wireless NIC terminal 130 may converts the image and sound data into an HDMI signal, a format available for a display input/output, and then, may provide the converted HDMI signal into the display device 140. Hereinafter, according to this embodiment, a TV is exemplarily used as the display device 140.

The TV 140 plays the image and sound data provided from the wireless NIC terminal 130. That is, the TV 140 plays the image and sound data provided from the notebook computer 110 in real-time through the wireless NIC terminal 130.

Hereinafter, a wireless NIC transmitting/receiving device and a wireless NIC terminal according to an embodiment will be described in more detail.

Figure 2:
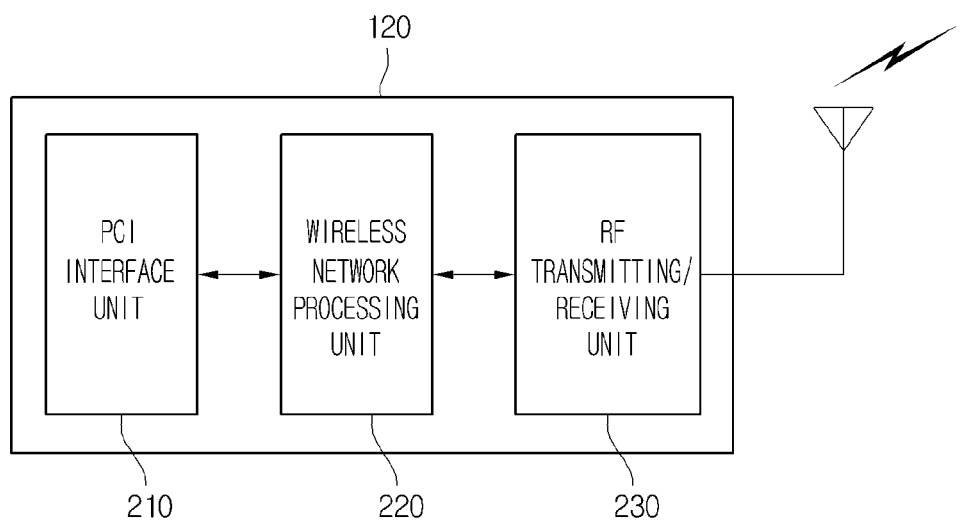
FIG. 2 illustrates a configuration of a wireless NIC transmitting/receiving device according to an embodiment.

FIG. 2 illustrates a configuration of a wireless NIC transmitting/receiving device according to an embodiment.

Referring to FIG. 2, the wireless NIC transmitting/receiving device 120 includes a PCI interface unit 210, a wireless network processing unit 220, and an RF transmitting/receiving unit 230.

The PCI interface unit 210 is connected to a PCI terminal or a PCIe terminal of the notebook computer 110, i.e., an external interface terminal.

The PCI terminal is a local bus for connecting a Central Processing Unit (CPU) of the notebook computer 110 with a peripheral device to provide a data path for delivering data at high speed. Moreover, the PCIe terminal is developed to overcome limitations of the PCI terminal through a series connection technology. For convenience of description, it is assumed in this embodiment that the PCIe terminal is used.

Through the PCIe terminal, the wireless NIC transmitting/receiving device 120 may exchange data at high speed with the notebook computer 110.

The wireless network processing unit 120 performs signal processing to transmit data through WiGig, i.e., the 60 GHz based next generation wireless transmission technique, or a broadband transmission technology prescribed in IEEE 802.15.c.

In more detail, the wireless network processing unit 220 encodes a PCIe signal inputted from the PCI interface unit 210 according to a predetermined encoding method and modulates the encoded signal according to a predetermined modulation method to output modulation symbols.

At this point, as the encoding method, convolution coding, turbo coding, and Low Density Parity Check Coding (LDPC) may be used. Also, as the modulation method, m-Phase Shift Keying (m-PSK) or m-Quardrature Amplitude Modulation (m-QAM) may be used.

The wireless network processing unit 220 adds a control signal such as a preamble signal to the modulation symbols, and then, converts it into an analog signal. Then, the wireless network processing unit 220 provides the converted analog signal into the RF transmitting/receiving unit 230.

Moreover, when receiving a signal from the wireless terminal device 100, the wireless network processing unit 220 converts the analog signal inputted from the RF transmitting/receiving unit 230 into a digital signal, and then, removes the control signal such as a preamble signal. Then, the wireless network processing unit 220 demodulates the digital signal having the control signal removed according a predetermined demodulation method, and then, decodes the demodulated signal according to a predetermined decoding method to output a PCIe signal. Then, the wireless network processing unit 220 provides the outputted PCIe signal into the PCI interface unit 210.

The RF transmitting/receiving unit 230 raises the analog signal inputted from the wireless network processing unit 220 to a frequency band signal (i.e., a 60 GHz band signal) that is to be transmitted, and then, amplifies the raised RF signal to transmit it through an antenna.

Additionally, the RF transmitting/receiving unit 230 converts the RF signal received from the wireless NIC terminal 130 into a baseband signal and provides the converted baseband signal into the wireless network processing unit 220.

Like this, the wireless NIC transmitting/receiving device 120 delivers the Ethernet signal received from the wireless NIC terminal 130 to the notebook computer 110. Additionally, the wireless NIC transmitting/receiving device 120 may transmit the image and sound data received from the notebook computer 110 to the wireless NIC terminal 130 wirelessly.

Moreover, the wireless NIC transmitting/receiving device 120 is manufactured with a PCIe card type and is connected to a PCIe terminal at one side of the notebook computer 110. However, since the 60 GHz signal transmitted through an antenna of the wireless NIC transmitting/receiving device 120 has very strong straightness, it is difficult to insert the antenna into the notebook computer 110.

Accordingly, the antenna may be disposed at the end of the PCIe card to expose an antenna portion of the wireless NIC transmitting/receiving device 120 to the outside of the notebook computer 110. Moreover, a plurality of patch antennas may be used as an antenna of the wireless NIC transmitting/receiving device 120.

Figure 3:
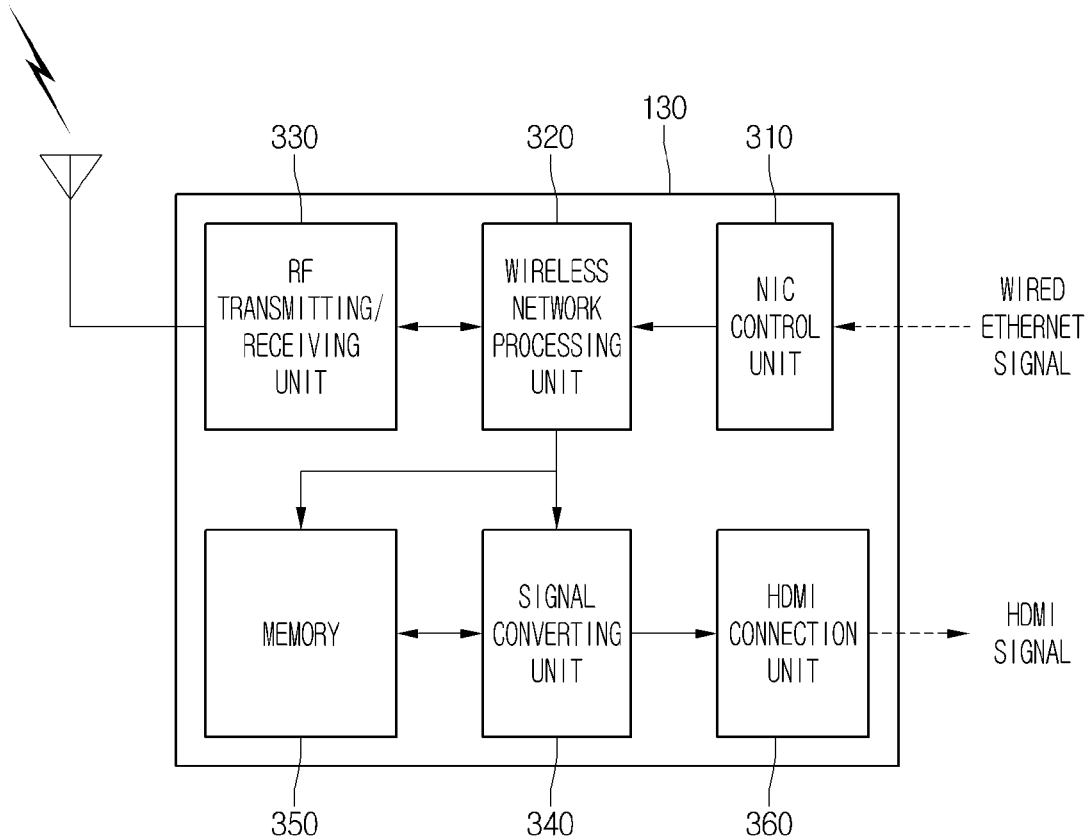
FIG. 3 illustrates a configuration of a wireless NIC terminal according to an embodiment.

FIG. 3 illustrates a configuration of a wireless NIC terminal according to an embodiment.

Referring to FIG. 3, the wireless NIC terminal 130 includes a NIC control unit 310, a wireless network processing unit 320, a RF transmitting/receiving unit 330, a signal converting unit 340, a memory 350, and an HDMI connection unit 360.

The NIC control unit 310 converts a gigabit wired Ethernet signal entering into the home 100 from the external Internet network 150 into a signal compatible with the wireless terminal device 100, for example, a PCIe signal, and then, delivers the converted PCIe signal into the wireless network processing unit 320.

The wireless network processing unit 320 performs signal processing to transmit data through WiGig, i.e., the 60 GHz based next generation wireless transmission technique, or a broadband transmission technology prescribed in IEEE 802.15.c.

In more detail, the wireless network processing unit 320 encodes the PCIe signal inputted from the NIC interface unit 310 according to a predetermined encoding method and modulates the encoded signal according to a predetermined modulation method to output modulation symbols.

Then, the wireless network processing unit 320 adds a control signal such as a preamble signal to the modulation symbols, and then, converts it into an analog signal. Then, the wireless network processing unit 320 provides the converted analog signal into the RF transmitting/receiving unit 330.

Moreover, the wireless network processing unit 320 converts the analog signal inputted from the RF transmitting/receiving unit 330 into a digital signal, and then, removes the control signal such as a preamble signal. Then, the wireless network processing unit 320 demodulates the digital signal having the control signal removed according a predetermined demodulation method, and then, decodes the demodulated signal according to a predetermined decoding method to output a PCIe signal.

Then, the wireless network processing unit 320 provides the outputted PCIe signal into the signal converting unit 340. At this point, the wireless network processing unit 320 converts the PCIe signal into a Universal Serial Bus (USB) signal, and then, provides it to the signal converting unit 340. Then, the wireless network processing unit 320 may store the PCIe signal in the memory 350.

The RF transmitting/receiving unit 330 raises the analog signal inputted from the wireless network processing unit 320 to a frequency band signal (i.e., a 60 GHz band signal) that is to be transmitted, and then, amplifies the raised RF signal to transmit it through an antenna. At this point, the signal transmitted by the RF transmitting/receiving unit 330 is an Ethernet signal inputted from the external internet network 150.

Additionally, the RF transmitting/receiving unit 330 converts the RF signal received from the wireless NIC terminal 120 into a baseband signal and provides the converted baseband signal into the wireless network processing unit 320. At this point, the signal transmitted by the RF transmitting/receiving unit 330 is image and sound data signal provided from the notebook computer 110.

The signal converting unit 340 converts a PCIe signal or a USB signal, outputted from the wireless network processing unit 220, into an HDMI signal, and provides the converted HDMI signal into the HDMI connection unit 360. Moreover, the signal converting unit 340 may store the HDMI signal in the memory 350.

The HDMI connection unit 360 is connected to the HDMI terminal of the TV 150 to deliver the HDMI signal inputted from the signal converting unit 340 into the TV 150.

The memory 350 may store the image and sound data provided from the notebook computer 110. Here, the memory 350 may include a large capacity storage medium such as a disk, a magnetic disk, and Hard Disk drive (HDD), a small capacity storage medium such as a Read-Only Memory (ROM) and a Random Access Memory (RAM), and/or another storage device.

Like this, the wireless NIC terminal 130 may transmit a gigabit wired Ethernet signal entering from the external internet network 150 into the notebook computer 110 through a broadband 60 GHz frequency band.

Additionally, the wireless NIC terminal 130 may transmit the image and sound data transmitted from the wireless NIC transmitting/receiving device 120 to the TV 150. Moreover, the wireless NIC terminal 130 may adapt a plurality of patch antennas to improve a data transfer rate.

Figure 4:
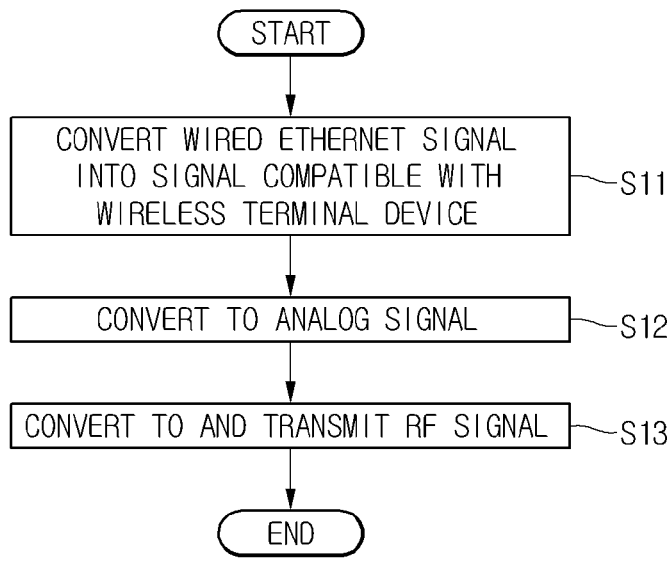
FIG. 4 is a flowchart illustrating a network interface method according to an embodiment.

FIG. 4 is a flowchart illustrating a network interface method according to an embodiment. FIG. 4 illustrates operations executed in the wireless NIC terminal 130 according to an embodiment.

In operation S11, a gigabit wired Ethernet signal is converted into a signal compatible with a wireless terminal device. The signal compatible with a wireless terminal device may include a PCI or PCIe signal compatible with a notebook computer. Before this operation, an operation for receiving a gigabit wired Ethernet signal through a predetermined interface may be performed in advance.

In operation S12, the signal compatible with a wireless terminal device is converted into an analog signal. In more detail, a wireless network processing unit of the wireless NIC terminal 130 encodes the PCIe signal according to a predetermined encoding method, modulates the encoded signal according to a predetermined modulation method to output modulation symbols, and adds a control signal such as a preamble signal to the modulation symbols to convert it to an analog signal In operation S13, the analog signal is converted into an RF signal of a predetermined frequency band, and then, is transmitted to a wireless terminal device including a wireless NIC transmitting/receiving device. The signal converted into the RF signal may be amplified to a predetermined level, and then, transmitted.

As mentioned above, a user of a notebook computer wirelessly accesses a gigabit wired internet in a home, and thus, uses a high speed data service. Additionally, the user may transmit image and sound data stored in the notebook computer in real-time wirelessly to play them through a TV.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A network interface system comprising:
a network interface apparatus for receiving a gigabit wired Ethernet signal and for wirelessly transmitting an RF signal converted from the gigabit wired Ethernet signal;

a wireless terminal device comprising an external interface terminal exposed to an outside of the wireless terminal device; and a wireless NIC transmitting/receiving device connectable to the external interface terminal, the wireless NIC transmitting/receiving device for receiving the RF signal from the network interface apparatus and for transmitting, if the wireless NIC transmitting/receiving device is connected to the external interface terminal, a Peripheral Component Interconnect express (PCIe) signal converted from the RF signal to the wireless terminal through the external interface terminal, wherein the network interface apparatus comprises:
a Network Interface Card (NIC) control unit for converting the gigabit wired Ethernet signal into the PCIe signal;
a first wireless network processing unit for converting the PCIe signal received from the NIC control unit into an analog signal; and
a first RF transmitting/receiving unit for converting the analog signal inputted from the first wireless network processing unit into an RF signal of a predetermined frequency band and for wirelessly transmitting the RF signal, and wherein the wireless NIC transmitting/receiving device comprises:
a second RF transmitting/receiving unit for wirelessly receiving the RF signal outputted from the network interface apparatus and converting the RF signal into an analog signal;
a second wireless network processing unit for converting the analog signal received from the second RF transmitting/receiving unit into a PCIe signal; and
a PCI interface unit connectable to the external interface terminal, the PCI interface unit for delivering, if the PCI interface unit is connected to the external interface terminal, the PCIe signal received from the second wireless network processing unit to the wireless terminal device through the external interface terminal.

2. The network interface system according to claim 1, wherein the NIC control unit converts the wired Ethernet signal into a Peripheral Component Interconnect (PCI) signal.

3. The network interface system according to claim 1, wherein the first RF transmitting/receiving unit converts an image and sound data signal received from the wireless terminal device into a baseband signal; and
the first wireless network processing unit converts the converted baseband signal into a PCIe signal.

4. The network interface system according to claim 3, wherein the network interface apparatus further comprises a signal converting unit for converting the PCIe signal inputted from the first wireless network processing unit into a High-Definition Multimedia Interface (HDMI) signal to provide the converted HDMI signal to a display device.

5. The network interface system according to claim 4, wherein the network interface apparatus further comprises a memory for storing at least one of the PCIe signal inputted from the first wireless network processing unit and the HDMI signal inputted from the signal converting unit.

6. The network interface system according to claim 1, wherein the first wireless network processing unit performs signal processing through a WiGig transmission method.

7. The network interface system according to claim 1, wherein the network interface apparatus further comprises a plurality of patch antennas for wirelessly transmitting the RF signal inputted from the first RF transmitting/receiving unit.

8. A network interface method comprising:
converting, by a network interface apparatus, a gigabit wired Ethernet signal into a Peripheral Component Interconnect express (PCIe) signal;
converting, by the network interface apparatus, the PCIe signal into an analog signal;
converting, by the network interface apparatus, the analog signal into an RF signal of a predetermined frequency band;
wirelessly transmitting, by the network interface apparatus, the RF signal;
wirelessly receiving, by a wireless NIC transmitting/receiving device, the RF signal outputted from the network interface apparatus;
converting, by the wireless NIC transmitting/receiving device, the RF signal into an analog signal;
converting, by the wireless NIC transmitting/receiving device, the analog signal into a PCIe signal; and
delivering, by the wireless NIC transmitting/receiving device, the PCIe signal to the wireless terminal device,
wherein the wireless terminal device comprises an external interface terminal exposed to an outside of the wireless terminal device,
wherein the wireless NIC transmitting/receiving device comprises a PCI interface unit connectable to the external interface terminal, and
wherein if the PCI interface unit is connected to the external interface terminal, the wireless NIC transmitting/receiving device receives the RF signal output from the network interface apparatus and delivers the PCIe signal to the wireless terminal device through the external interface terminal.

9. The network interface method according to claim 8, further comprising, when the network interface apparatus receives an image and sound signal from the wireless terminal device:
converting, by the network interface apparatus, a received wireless signal into a baseband signal; and
converting, by the network interface apparatus, the converted baseband signal into a PCIe signal.

10. The network interface method according to claim 9, further comprising converting, by the network interface apparatus, the PCIe signal into an HDMI signal to provide the converted HDMI signal to a display device.

11. The network interface method according to claim 10, further comprising storing, by the network interface apparatus, at least one of the PCIe signal and the HDMI signal, which are converted from the baseband signal.

12. The network interface method according to claim 8, wherein the network interface apparatus comprises a plurality of patch antennas for transmitting the RF signal.

* * * * *